United States Patent [19]
Meldrum

[11] 3,831,923
[45] Aug. 27, 1974

[54] NOISE PREVENTING SHOCK ABSORBER
[75] Inventor: Charles R. Meldrum, Detroit, Mich.
[73] Assignee: Ace Controls, Inc., Farmington, Mich.
[22] Filed: Jan. 12, 1973
[21] Appl. No.: 323,061

[52] U.S. Cl................ 267/141, 267/63 R, 267/153
[51] Int. Cl............................................. F16f 7/12
[58] Field of Search .......... 269/137, 140, 141, 152, 269/153, 63 A

[56] References Cited
UNITED STATES PATENTS
| | | | |
|---|---|---|---|
| 2,719,017 | 9/1955 | Mordarski et al. | 267/153 |
| 2,893,665 | 7/1959 | Paulsen | 267/153 |
| 3,135,506 | 6/1964 | Wigan | 267/152 |

Primary Examiner—James B. Marbert
Attorney, Agent, or Firm—Robert G. Mentag

[57] ABSTRACT

A noise preventing shock absorber adapted for silently absorbing the sound due to noise sources, as when moving machine parts engage mating surfaces and decelerate to zero velocity within a short travel distance or stroke. The shock absorber includes a unitary resilient member having an annular force-receiving surface on the lower end thereof and a force-receiving surface on the upper end thereof which is disposed radially within and axially spaced apart from the lower force-receiving surface, and said resilient member being inverted dish-shaped in vertical cross section and provided with an axially inward extended recess on the lower side thereof within the annular lower force-receiving surface. The shock absorber member can be used in a stacked arrangement, with or without an outer casing, to provide a unit of increased shock absorbing and noise preventing capacity.

37 Claims, 28 Drawing Figures

NOISE PREVENTING SHOCK ABSORBER

SUMMARY OF THE INVENTION

This invention relates generally to noise preventing apparatuses, and more particularly to a novel and improved noise preventing shock absorber for preventing noises due to moving impact loads decelerating to zero velocity and impacting with a mating surface.

The control and abatement of noise pollution is a current and continuing problem, and at the present time industry is faced with government imposed noise levels under which manufacturing equipment must be operated. Accordingly, there is an increasing need for more efficient apparatuses for absorbing and abating noise due to the operation of industrial manufacturing equipment. Some of the industrial machines which are noise sources and which require noise abatement means are draw presses, hydro-forming machines, molding machines, piercing machines, die press machines, and the like. In a die press machine, for example, it is important to suppress the noise caused when a stripper plate is snapped back into its original position. A stripper plate represents a structure which is oscillating at a certain number of strokes per minute and which is decelerated to zero velocity at each end of a stroke, and within a one-half to one inch maximum stroke. The type of noise caused by the operation of a stripper plate on a press is typical of shop noises which are a hazard and a danger to the wellbeing and safety of the employees working in the area surrounding such a press. A continued impact noise creates noise levels which decrease the efficiency and morale of a press operator and other employees in the vicinity of the machine. Furthermore, the use of ear plugs and the like is frowned upon by agencies administering the saftey rules for shops, as well as by the employees' unions. In view of the foregoing, it is an important object of the present invention to provide a novel and improved shock absorber for preventing noise due to the operation of various types of industrial machinery, and which will reduce noise pollution in a manufacturing facility.

It is another object of the present invention to provide a sound and noise absorbing apparatus formed from a resilient type material, and which absorbs a maximum amount of impact and suppresses a proportional related noise. The noise preventing apparatus provides a means for diminishing or eliminating oscillatory loads of varying frequencies, duration and amplitudes, and which loads are classified as hard energy loads.

It is still another object of the present invention to provide a novel and improved sound and noise absorbing apparatus which is simple and compact in construction, economical to manufacture and efficient in operation.

It is a still further object of the present invention to provide a novel and improved sound and noise absorbing apparatus which can be made by any suitable method as, for example, by pressurized molding, and which is inverted dish-shaped in configuration and adapted to accommodate different loads in accordance with the type of resilient material used and the cross section configuration of the apparatus. The noise absorbing apparatus can be used as a single module or in a stacked or plural arrangement so as to provide units of varying noise absorbing capacities.

It is still another object of the present invention to provide a novel and improved noise and sound preventing shock absorber which includes a unitary resilient member having an annular force-receiving surface on the lower end thereof, and a force-receiving surface on the upper end thereof which is disposed radially within and axially apart from the lower force-receiving surface. The shock absorber member is inverted dish-shaped and provided with an axially inward extended recess on the lower side thereof, within the annular force-receiving surface. The shock absorber member may be provided with an axial bore therethrough in which may be received a shock impact receiving button, or a shaft for attaching the shock absorber member to an impact load means. The shock absorber member may also be provided with upper and lower load transmitting surfaces for stacking a plurality of these members in various stacked arrangements, with or without an outer casing, in order to provide units of varying noise abatement capacities.

Other features and advantages of this invention will be apparent from the following detailed description, appended claims, and the accompanying drawings.

DESCRIPTION OF THE PREFERRED EMBODIMENTS

Figure 1:
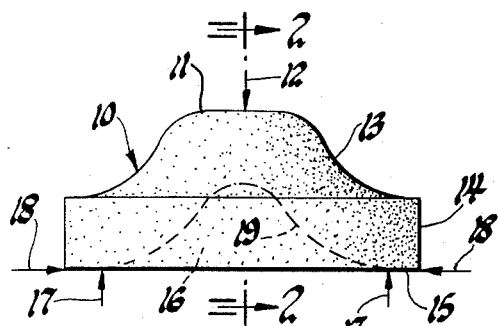
FIG. 1 is a side elevational view of a noise preventing shock absorber member made in accordance with the principles of the present invention.
Figure 2:
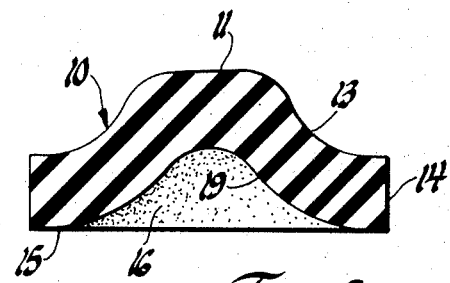
FIG. 2 is an elevational section view of the structure illustrated in FIG. 1, taken along the line 2—2 thereof, and showing the inverted dish-shape of the shock absorber member.

Referring now to the drawings and in particular to FIGS. 1 and 2, the numeral 10 generally designates a noise preventing shock absorber member made in accordance with the principles of the present invention. The shock absorber member 10 is inverted dish-shaped in vertical cross section, and is circular in plan form. The shock absorber member 10 is concentrically formed around its vertical center line. The inverted dish-shaped shock absorber member 10 is provided on the upper end thereof with a flat annular force-receiving surface, indicated by the numeral 11, for receiving an applied impact load, generally indicated by the arrow 12.

The upper surface 13 of the shock absorber member 10 is shaped concave downwardly, and radially outward from said upper force-receiving surface 11, and it terminates at the upper end of the vertical peripheral base side wall surface 14. The side wall surface 14 terminates at the flat lower end indicated by the numeral 15. The lower end 15 of the shock absorber member 10 is annular in plan view, and it functions as a lower force-receiving surface. The upper force-receiving surface 11 is parallel to and concentrically mounted within the annular lower force-receiving surface 15.

The shock absorber member 10 is provided on its lower end with an upwardly and axially extended concave recess, indicated by the numeral 16. The upper force-receiving surface 11 is the point of contact of the applied impact forces 12 acting on the shock absorber member 10, and the surface 11 experiences a combined compressive shear and bending stress that decelerates the applied load 12 by deforming the general shape of the inverted dish-shaped member, and thereby moving the cylindrically positioned walls in an outward direction. The displacement of the dish-shaped member is resisted by counter forces 17 operating against the force-receiving surface 15. Counter reaction forces 18 are also built up in the direction of the arrows 18 in FIG. 1 due to the friction between the supporting surface on which the shock absorber member 10 is seated and the force-receiving surface 15. It will be seen that the lower surface 19 of the shock absorber member 10 is formed by the walls of the recess 16 and that it is substantially convex downwardly, radially outward from the upper end of the recess 16. As shown in FIG. 2, the vertical cross section thickness between the upper and lower surfaces 13 and 19 is sustantially constant from the vertical center line outwardly to the peripheral side wall surface 14.

The shock absorber member 10 may be made from a suitable resilient material, as for example rubber, a rubber-like material or an elastomeric material. A suitable synthetic elastomeric material is a urethane elastomeric material, and it is available on the market under the registered trademark "Cyanaprene."

The shock absorber members 10 may be made by any suitable method as, for example, by molding from a suitable material. It is preferable to use a material which has a long useful life and can resist storage under all types of conditions, and also resist deterioration due to heat.

It will be seen that the shock absorber 10 can be used for suppressing noise on industrial machines and the like. The configuration of the shock absorber 10 allows a gradual and uniform build-up of strain energy throughout the structure of this member. The shape of the shock absorber member eliminates stress concentrations and increases the longevity of the shock absorber member. A possible use is in the suppressing of the noise created when the stripper plate of a press is snapped back into its original position. The weight of a stripper plate can vary from 1 thousand to 20 thousand pounds. The shock absorber member 10 in one embodiment is capable of silently absorbing the sound due to an impact of three thousand pounds decelerating to zero velocity within one-half to 1 inch maximum stroke, and at a rate of 30 strokes per minute.

Figure 3:
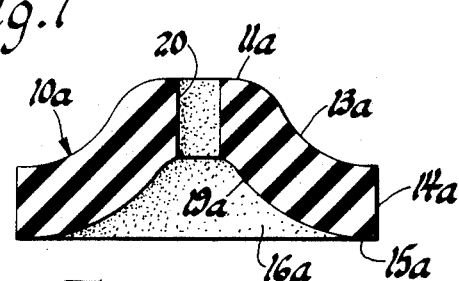
FIG. 3 is an elevational section view of a second embodiment of the invention, and showing the shock absorber member of FIG. 2 provided with an axial bore.

FIG. 3 illustrates an embodiment of the invention, and it is similar to the embodiment of FIGS. 1 and 2 and the same reference numerals have been used for the corresponding parts followed by the small letter *a*. The only difference between the structure of FIG. 3 and that of the first embodiment of FIGS. 1 and 2 is that a central axial bore 20 is provided through the shock absorber 10*a*, and it extends from the upper force-receiving surface into communication with the recess 16*a*. The addition of the bore 20 permits the attaching of the shock absorber member 10*a* to the shock impact device, is desired. It will be understood that the bore 20 could be molded in the shock absorber member 10 when it is initially formed.

Figure 4:
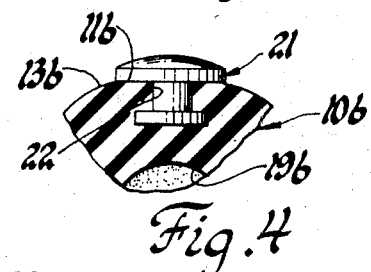
FIG. 4 is a fragmentary, elevational section view of the shock absorber member of FIGS. 1 and 2, provided with an impact button

FIG. 4 illustrates a modified shock absorber member 10*b* which is made similar to the shock absorber 10 of FIGS. 1 and 2, and the corresponding parts thereof are marked with the same reference numerals followed by the smaller letter *b*. The only difference between the structure of FIG. 4 and that of FIGS. 1 and 2 is that the shock absorber member 10b has been provided with an inverted T-shaped bore 22 in which is positioned the inverted T-shaped shaft of an impact button 21. The button 21 may be made from any suitable material as, for example, a suitable metal. The impact button 21 functions as a means of picking up the impact force 12 directed to the shock absorber member 10b. The upper face of the impact button 21 is provided with a convex surface for picking up an impact or mass-velocity load which may be directed thereagainst at an angle other than 90° normal to the force receiving surface 11b.

Figure 5:
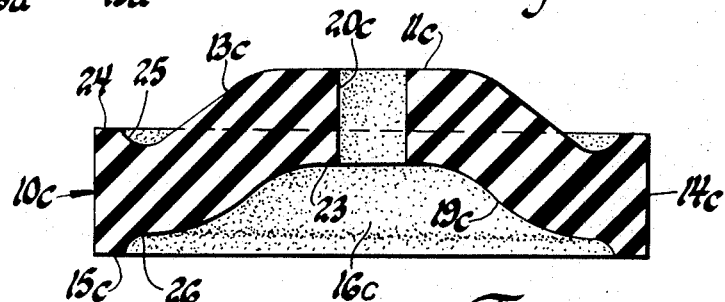
FIG. 5 is an elevational section view of a third embodiment of the invention, and showing a shock absorber member provided with upper and lower peripheral bearing surfaces.

FIG. 5 illustrates a further embodiment of the invention which is constructed similarly to the embodiment of FIG. 3, and which is provided with the same reference numerals as the basic embodiment of FIGS. 1 and 2 followed by the small letter c. The embodiment of FIG. 5 is provided with a downwardly extended flange on the lower end of the periphery 14c, and on the lower surface of which is formed a lower force-receiving surface 15. An upwardly extended flange is formed on the upper end of the periphery 14c and the upper surface of this flange is indicated by the numeral 24 and it comprises an upper load transmitting surface which is vertically aligned with the lower force-receiving surface 15c. The upper or internal end surface of the recess 16c is formed as a flat surface 23 which is parallel to the upper force-receiving surface 11c, and it comprises a lower load transmitting surface. The load transmitting surface 23 is also parallel to the upper load transmitting surface 24 and the lower force-receiving surface 15c. The upper surface 13c of the shock absorber member is joined to the upper flange on which the surface 24 is formed by a suitable stress relieving fillet 25. A similar stress relieving fillet 26 is formed at the lower end of the shock absorber member lower surface at the point where it meets the lower flange on which the lower force-receiving surface 15c is formed. The structure of the embodiment of FIG. 5 is adapted for use in a stacked arrangement wherein more than one of the shock absorber members 10c are used, as will be more fully explained hereinafter.

Figure 6:
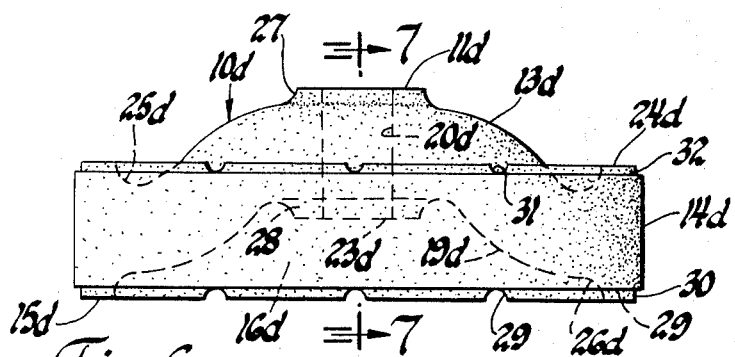
FIG. 6 is a side elevational view of a fourth embodiment of the invention, showing a shock absorber member provided with a raised, peripheral boss around each of the top and bottom ends of an axial hole formed through the shock absorber member.
Figure 7:
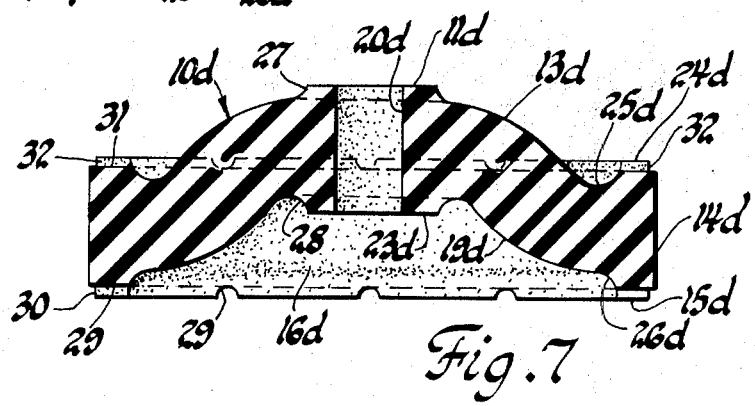
FIG. 7 is an elevational section view of the structure shown in FIG. 6 taken along the line 7—7 thereof, and looking in the direction of the arrows.

FIGS. 6 and 7 illustrate a fourth embodiment of the invention which is constructed similar to the embodiments of FIGS. 1 and 5, and which is provided with the same reference numbers of said FIG. 1 and 5, followed by the small letter d. The embodiment of FIGS. 6 and 7 is provided with a raised circular boss 27 about the periphery of the bore 20d, and the upper force-receiving surface 11d is formed on the upper end surface of the boss 27. A downwardly extending boss 28 is formed around the lower end of the bore 20d, and the lower load transmitting surface 23d is formed on the lower end thereof. A plurality of radially disposed semicircular holes 29 are formed through the lower periphery of the shock absorber 10d, and they are open to the lower force-receiving surface 15d. A similar plurality of openings 31 are formed through the upper periphery and communicate with the upper load transmitting surface 24d. The outer peripheral surface 14d is recessed at the lower and upper ends thereof to provide the annular or circular peripheral recesses 30 and 32, repsectively. The holes 29 and 31, and the annular recesses 30 and 32 permit air flow to the exterior of the shock absorber member 10d for heat dissipation purposes. The embodiment of FIGS. 6 and 7 functions in the same manner as the previously described embodiments.

Figure 8:
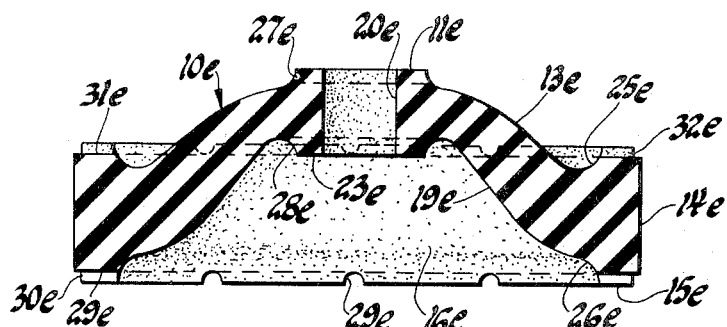
FIG. 8 is an elevational, vertical cross section view of a fifth embodiment of the invention, similar to the embodiment of FIG. 7, but showing the vertical cross section area of the shock absorber member increasing radially outward.

FIG. 8 illustrates another embodiment which is similar to the embodiment of FIGS. 6 and 7, and in which the corresponding parts have been marked with the same reference numerals followed by the small letter e. The only difference between the embodiment of FIGS. 6 and 7 and the embodiment of FIG. 8 is that the cross sectional area instead of being constant, from the force-receiving surface 11e and the load transmitting surface 23e outwardly to the load receiving surface 29e and the load transmitting surface 31e, increases radially outward. It has been found that the shear stress drops off as the distance outwardly from the center line of the shock absorber member increases. However, the vertical cross sectional area can be varied in accordance with the type of performance required, for example, the amount of time required to stop a given mass-speed combination, the maximum tolerable load, and the stroke required to bring about a zero velocity at the end of a stroke. FIG. 8 functions in the same manner as the previously described embodiments.

Figure 9:
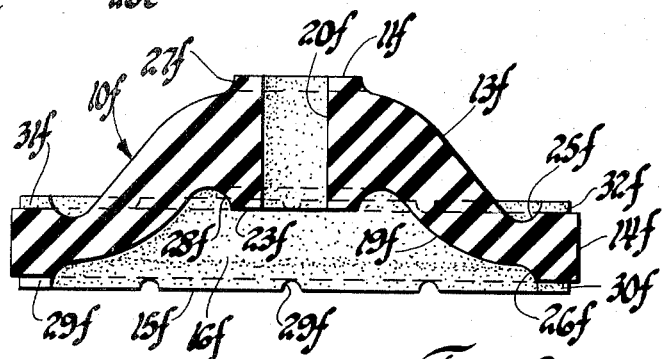
FIG. 9 is an elevational, vertical cross section view of a sixth embodiment of the invention, similar to the embodiment shown in FIG. 8, but with the vertical cross section of the shock absorber member decreasing radially outward.

FIG. 9 is an elevational section view of another embodiment of the invention which is constructed in the same manner as the embodiment of FIGS. 6 and 7, and in which the corresponding parts have been marked with the same reference numerals followed by the small letter f. The only difference between the embodiment of FIGS. 6 and 7 and the embodiment of FIG. 9 is that the cross sectional area decreases from the center outwardly in a manner opposite to that shown in FIG. 8. The embodiment of FIG. 9 functions in the same manner as the previously described embodiments.

FIGS. 10 through 19 are elevational cross section views of further embodiments of the invention, and show further illustrations of variously shaped top or upper and lower surfaces which may be employed in forming the shape of the shock absorber member of the present invention. The parts of the embodiments illustrated in FIGS. 10 through 19 which are similar to the parts of the embodiment of FIGS. 6 and 7 have been marked with the same reference numerals followed by the small letters g through p, respectively.

Figure 10:
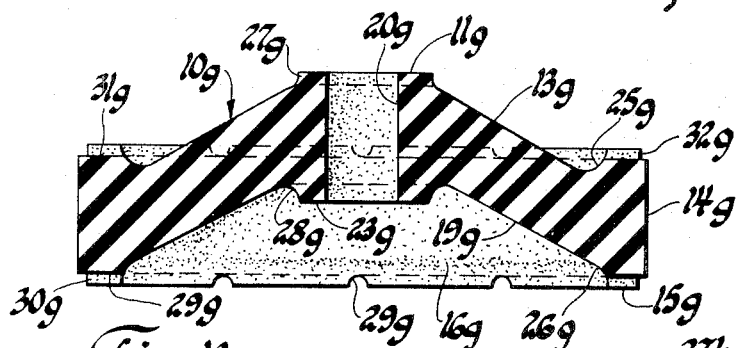
FIGS. 10 through 20 show elevational section views of additional embodiments having various vertical cross sections and variously shaped upper and lower surfaces.

In the embodiment of FIG. 10, the upper and lower surfaces 13g and 19g, respectively, of the shock absorber member 10g are conically shaped radially outward from the upper force-receiving surface 11g and the upper load transmitting surface 23g. The upper and lower surfaces 13g and 19g, respectively, are parallel to each other so as to provide a constant cross section wall thickness.

Figure 11:
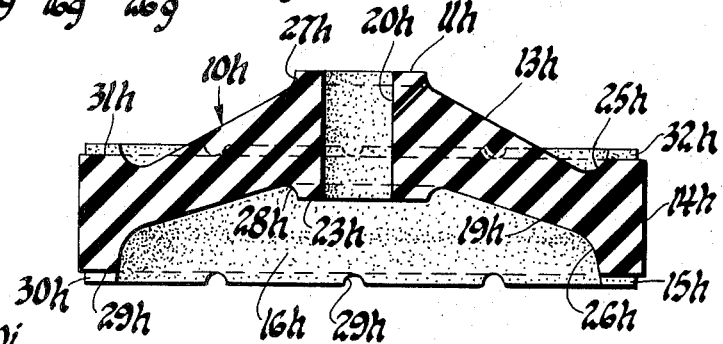
Figure 12:
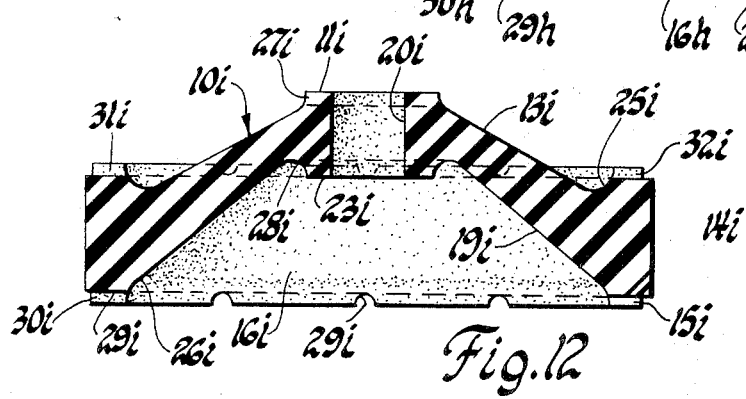

In the embodiment of FIG. 11, the shock absorber member upper and lower surfaces 13h and 19h, respectively, are also conically shaped radially outward, but they converge radially outward. In the embodiment of FIG. 12, the upper and lower shock absorber surfaces 13i and 19i are also conically shaped radially outward, but they diverge radially outward.

Figure 13:
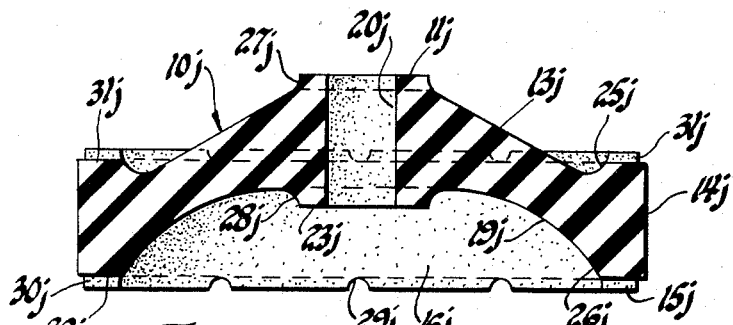

In the embodiment of FIG. 13, the shock absorber member upper surface 13j is conically shaped radially outward from the upper force-receiving surface 11j, but the lower surface 19j is shaped concave upwardly, radially outward from the lower load transmitting surface 23j. The configuration of the shock absorber member illustrated in FIG. 13 provides for a uniform shear stress through the elevational cross section, regardless of where a concentric cut is taken radially outward from the axial center line of the shock absorber member 10j. In the embodiment of FIG. 13, the vertical cross section of the unitary resilient member decreases radially outward from the axial bore so as to provide a constant vertical and circular section area progressively outward, radially from the axial bore.

Figure 14:
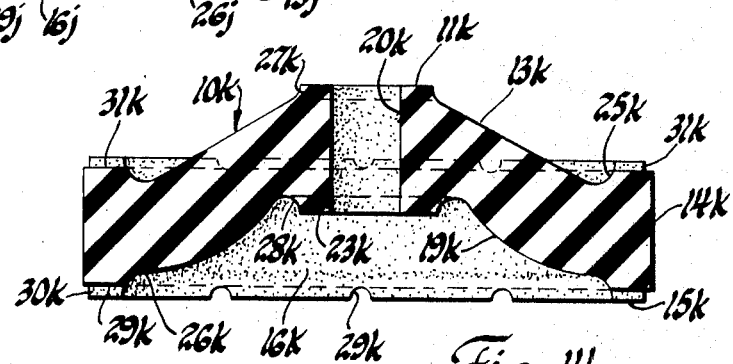

In the embodiment of FIG. 14, the upper surface 13k of the shock absorber member 10k is conically shaped radially outward from the upper force-receiving surface 11k. The lower surface 19k of the shock absorber member 10k is formed convex downwardly, radially outward from the lower load transmitting surface 23k.

Figure 15:
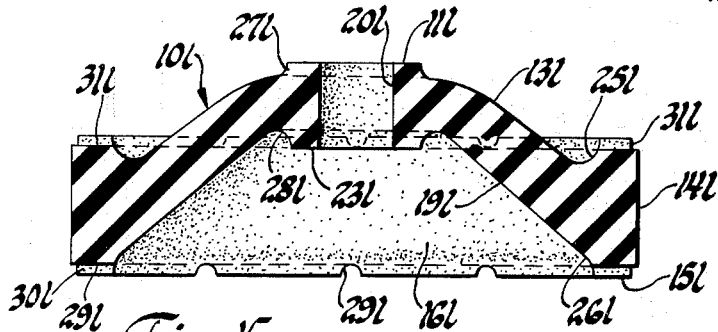

In the embodiment of FIG. 15, the upper surface 13l of the shock absorber member is formed convex upwardly, radially outward from the upper force-receiving surface 11l. The lower surface 19l of the shock absorber member is conically shaped radially outward from the lower load transmitting surface 23l.

Figure 16:
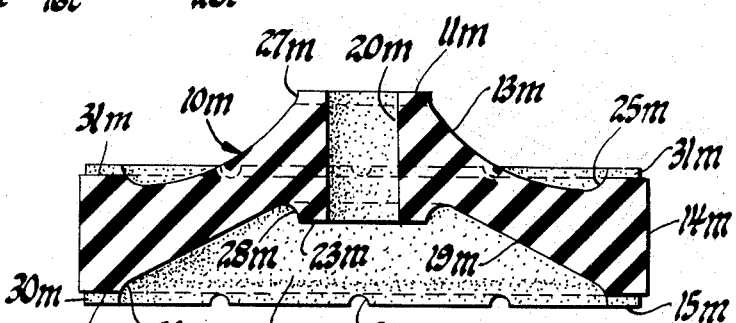

In the embodiment of FIG. 16, the upper surface 13m of the shock absorber 10m is shaped concave downwardly, radially outward from said upper force-receiving surface 11m. The lower surface 19m of the shock absorber member 10m is conically shaped radially outward from the lower load transmitting surface 23m.

Figure 17:
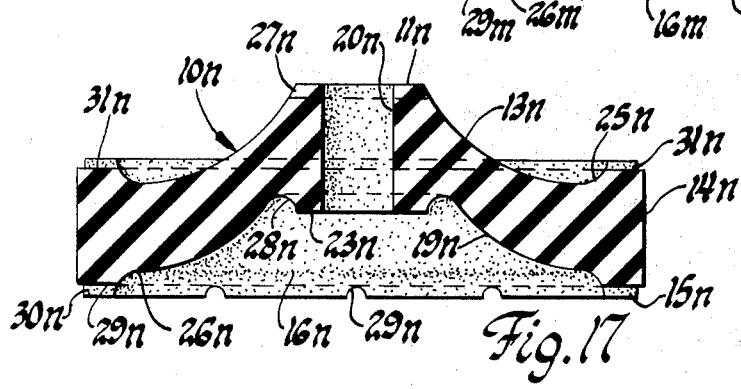

In the embodiment of FIG. 17, the upper surface 13n of the shock absorber member 10n is shaped concave downwardly, radially outward from the upper force-receiving surface 11n. The lower surface 19n of the shock absorber member 10n is shaped convex downwardly, radially outward from the lower load transmitting surface 23n.

Figure 18:
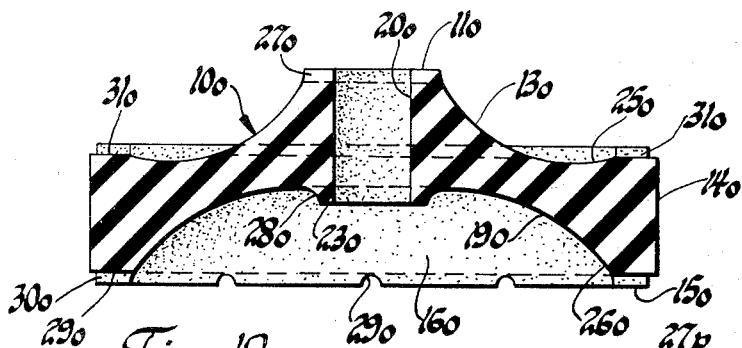

In the embodiment of FIG. 18, the upper surface 13o of the shock absorber member 10o is shaped concave downwardly, radially outward from the upper force-receiving surface 11o. The lower surface 19o of the shock absorber member 10o is shaped concave upwardly, radially outward from the lower load transmitting surface 23o.

Figure 19:
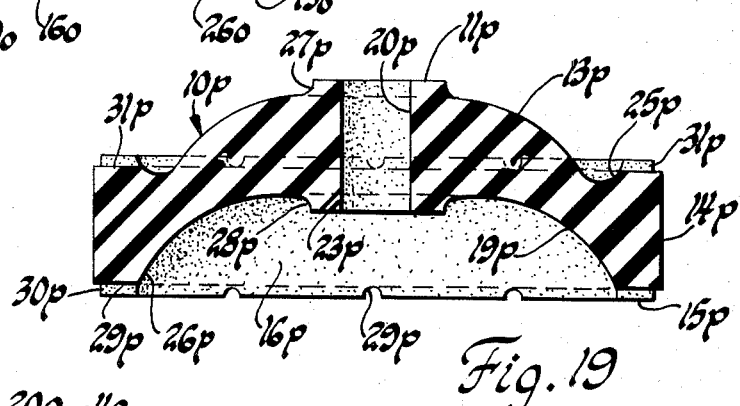

In the embodiment of FIG. 19, the upper surface 13p of the shock absorber member 10p is shaped convex upwardly, radially outward from the upper force-receiving surface 11p. The surface 19p of the shock absorber member 10p is shaped concave upwardly, radially outward from the lower load transmitting surface 23p.

The embodiments of FIGS. 10 through 19 function in the same manner as the previously described embodiments.

Figure 20:
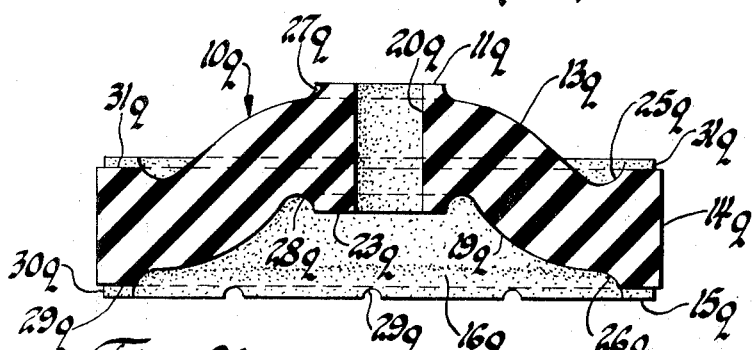

FIG. 20 is a vertical cross section view of another embodiment of the invention provided with a shape similar to the shape of the embodiment of FIG. 6. The parts of the embodiment of FIG. 20 which are the same as the embodiment of FIG. 6 are marked with the same reference numerals followed by the small letter $q$. The only difference between the embodiment of FIG. 20 and the embodiment of FIG. 6 is that the axial bore 20q in the embodiment of FIG. 20 is disposed off the center line of the shock absorber member so as to accommodate an eccentric load. However, the load is still received on the upper force-receiving surface 11q.

Figure 21:
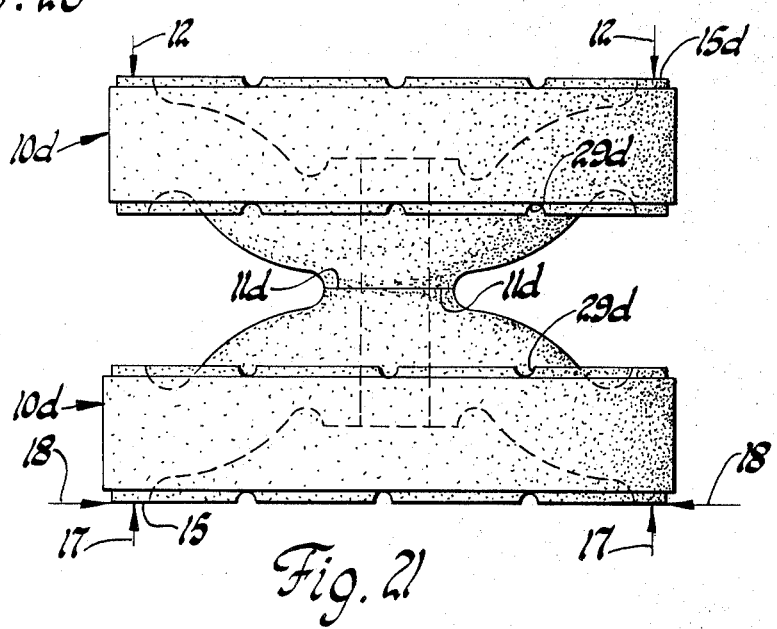
FIG. 21 shows a pair of the shock absorber members of FIGS. 6 and 7 stacked with their upper force-receiving surfaces abutting each other and in a position for absorbing a shock load during a compression stroke.

FIG. 21 illustrates one method of stacking a pair of shock absorbers made in accordance with the principles of the present invention so as to provide a unit having increased shock absorbing and noise preventing capacity. In the embodiment of FIG. 21 the pair of shock absorber members 10d are of the type shown in FIGS. 6 and 7, and they are disposed with one of the shock absorber members 10d in an inverted position so as to have the upper force-receiving surface 11d thereof disposed on the upper force-receiving surface 11d of the lowermost shock absorber member 10d. The arrows 12 indicate the applied impact forces acting on the shock absorbers 10d. The impact forces 12 operate on the lower force-receiving surface 15d of the uppermost shock absorber member 10d. The displacement of the dish-shaped members 10d is resisted by the counter forces 17 operating against the lower force-receiving surface 15d on the lowermost shock absorber member 10d. The numeral 18 also represents counter reaction forces.

Figure 22:
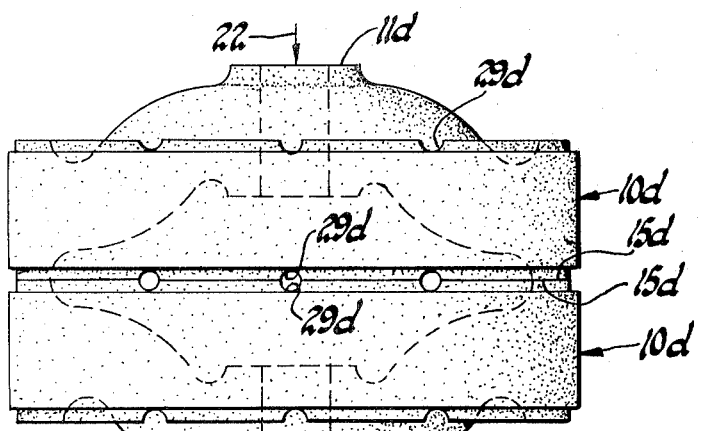
FIG. 22 shows a pair of the shock absorber members of FIGS. 6 and 7 in a stacked position with the lower force-receiving surfaces abutting each other and in a position to absorb a shock load during a compression stroke.

FIG. 22 illustrates a second method of stacking a pair of shock absorbers 10d, made in accordance with the principles of the present invention, and of the type illustrated in FIGS. 6 and 7. In the embodiment of FIG. 22, a pair of shock absorber members 10d are mounted with the lowermost shock absorber member 10d in an inverted position so as to have the lower force-receiving surface 15d of each shock absorber member abut each other. The numeral 12 indicates the applied impact forces acting on the upper force-receiving surface 11d of the uppermost shock absorber member 10d. The numeral 17 indicates the counter forces operating against the upper force-receiving surface 11d on the lowermost inverted shock absorber member 10d. The numeral 18 also represents counter reaction forces.

Figure 23:
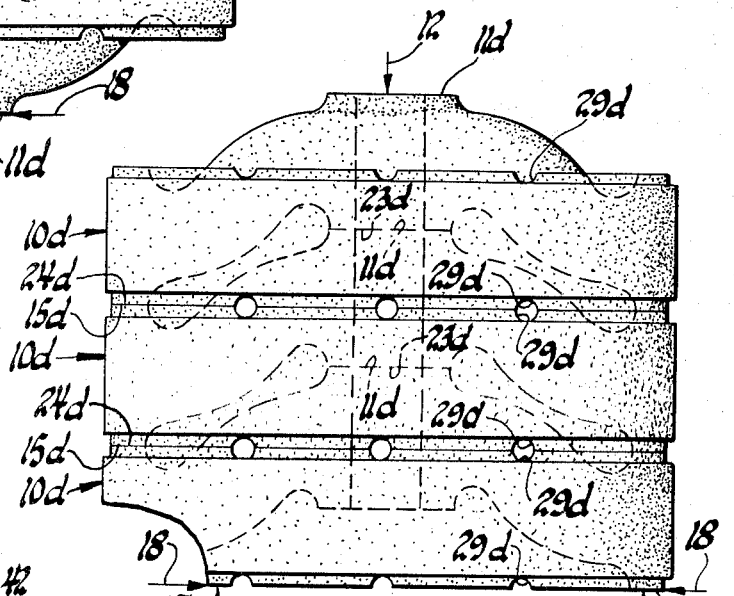
FIG. 23 shows a plurality of the shock absorber members of FIGS. 6 and 7 stacked one on top of another, and in a condition of absorbing a shock load during a compression stroke.

FIG. 23 illustrates still another method of stacking a plurality of the shock absorber members 10d of the structure illustrated in FIGS. 6 and 7. In the shock absorber unit shown in FIG. 23 a plurality of shock absorber members 10d are stacked in a series or vertical arrangement wherein the lowermost one is disposed on a supporting surface with the lower force-receiving surface 15d in engagement with the supporting surface and providing a surface against which reacts the counter forces 17. Counter reaction forces 18 are also built up in the direction of the arrows 18. The shock absorber member 10d next above the lowermost shock absorber member 10d is seated with its lower force-receiving surface 15d on the upper load transmitting surface 24d of the lowermost shock absorber member 10d. The upper force-receiving surface 11d of the lowermost shock absorber member 10d abuts against and supports the lower load transmitting surface 23d of the next above shock absorber member 10d. The last mentioned force transmission system is continued on up the stack, regardless of the number of shock absorber members 10d employed. The applied impact forces 12 react on the upper force-receiving surface 11d of the uppermost shock absorber member 10d.

In regard to FIGS. 21 and 22, it will be understood that the mating pairs of shock absorber members 10d shown therein can be duplicated and mounted on one another to form shock absorbing and noise preventing units of various desired capacities. The shock absorber members 10d illustrated in FIGS. 21, 22 and 23 are shown as having a constant vertical cross section, but it will be understood that they may have other shaped cross sections, as for example, any of the shapes illustrated in FIGS. 8–19.

Figure 24:
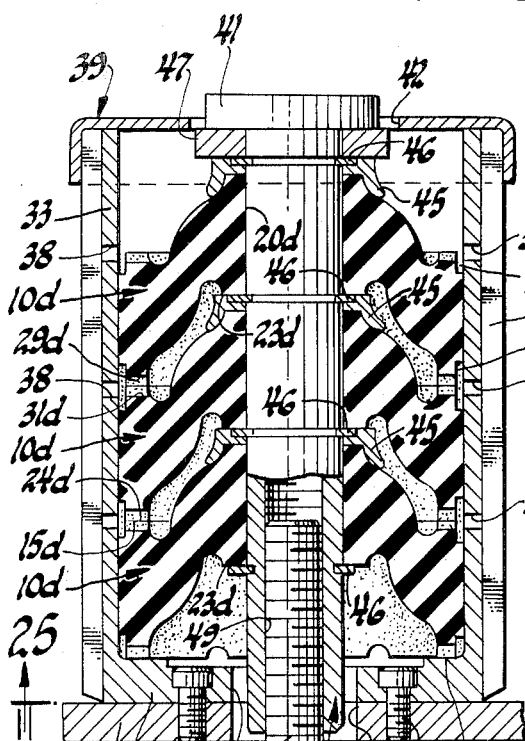
FIG. 24 is an elevational section view of a plurality of the shock absorber members of FIGS. 6 and 7, stacked in a series relationship on a central impact shaft, and encased in a cylindrical outer housing to restrict lateral movement of the shock absorber members.
Figure 25:
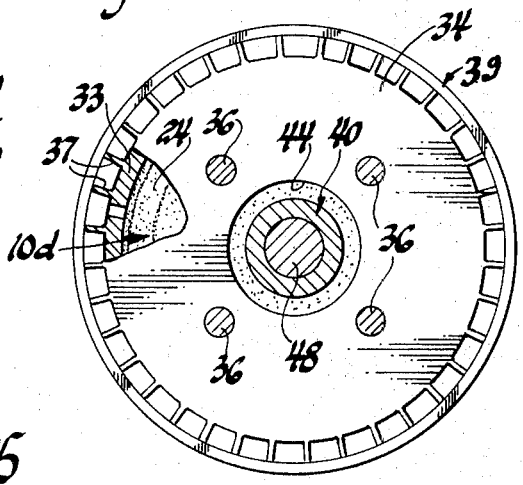
FIG. 25 is a horizontal section view of the structure of FIG. 24, taken long the line 25—25 thereof, and looking in the direction of the arrows.

FIGS. 24 and 25 illustrate a further method of stacking a plurality of the shock absorber members 10d of the structure illustrated in FIGS. 6 and 7. The shock absorber members 10d employed in FIGS. 24 and 25 are illustrated as having their upper force-receiving surfaces 11d spaced axially upward from the lower force-receiving surfaces 15d a distance slightly greater than that illustrated in FIGS. 6 and 7. The shock absorber members 10d are slidably mounted in a vertical stacked arrangement within an outer cylindrical housing 33 made from a suitable material, as for example a suitable metal material. The lower end of the outer casing 33 is enclosed by a radially inward extended lower end wall 34, on the inner surface of which is seated the lower force-receiving surface 15d of the lowermost shock absorber member 10d. The shock absorber unit of FIGS. 24 and 25 is adapted to be secured to a suitable supporting means, as for example the support plate 35, and to be releasably secured thereto by any suitable means, as by a plurality of machine screws 36.

As shown in FIGS. 24 and 25 the cylindrical casing 33 is provided with a plurality of circumferentially spaced, radially disposed and outwardly extended cooling fins 37 which extend for the length of the casing 33. The upper end of the casing 33 is enclosed by a dust cover generally indicated by the numeral 39. As shown in FIG. 24, the casing 33 is provided with a plurality of vent holes 39 for communication with the vent holes 29d and 31d formed through the shock absorber members 10d, and with the peripheral cooling recesses 30d and 32d formed in the periphery of each of the shock absorber members 10d.

As shown in FIG. 24, an impact shaft, generally indicated by the numeral 40, is slidably mounted through the axial holes 20d in the shock absorber members 10d. The impact shaft 40 is provided with an enlarged head 41 which is adapted to extend out through an opening 42 formed through the cover 39. The lower end of the shaft 40 extends through an opening 43 formed through the casing end wall 34 and through an opening 44 formed through the support plate 35.

Each of the shock absorber members 10d is provided with a load cap 45 which is seated on the upper force-receiving surface 11d and which is secured to the shaft 40 by a suitable spear and snap ring 46 which also seats in a recess in the load cap 45. It will be seen that the lower load transmitting surface 23d of a shock absorber member 10d is adapted to be seated on the next below load cap. The lowermost load transmitting surface 23d is seated on a snap ring 46. The load caps 45 and snap rings 46 provide a means to deliver equal loading from the shaft 40 to the individual shock absorber members 10d, and they provide uniform distribution of the load amongst the various shock absorber members 10d. The load caps 45 also provide uniform distribution of loading across the upper force-receiving surfaces 11d. A spacer washer member 47 is seated under the enlarged head 41 of the shaft 40 and it engages the uppermost load bearing cap 45 and retainer ring 46.

The impact shaft 40 is provided with an axially threaded bore 49, and threadably mounted in the lower end thereof is an adjustable rod 48 for attaching the mechanism to an impact load creating means. It will be understood that the shaft 48 could be made integral with the shaft 40. It will also be understood that the enlarged shaft head 41 could also be used as a force receiving means for an impact load. It will be understood that the axially disposed cooling vanes or fins 37 function as a means for dissipating heat generated in casing 33 by conduction from the shock absorber members 10d and by convection of hot air from inside the casing 33 to the exterior thereof. The vanes 37 may be formed integrally with the casing 33.

Figure 26:
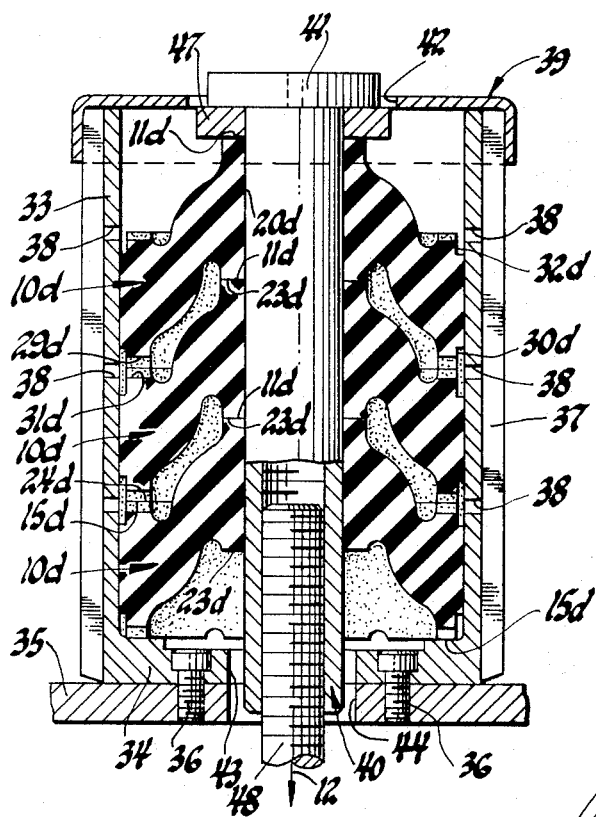
FIG. 26 is an elevational section view of a plurality of stacked shock absorber members, similar to the structure shown in FIG. 24, but with the spacer rings and load bearing caps between the shock absorber members being removed.

FIG. 26 is an elevational section view of a plurality of stacked shock absorber members 10d, similar to the stacked structure shown in FIG. 24, but with the load bearing caps 45 and spacer and snap rings 46 deleted. The embodiment of FIG. 26 would function in the same manner as the embodiment of FIGS. 24 and 25. However, in the embodiment of FIG. 26 the lower load transmitting surface 23d of an uppermost shock absorber member 10d is seated on the upper force-receiving surface 11d of the next below shock absorber member 10d. The lower force-receiving surface 15d of a next above shock absorber member 10d is seated on the upper load transmitting surface 24d of the next below shock absorber member 10d.

Figure 27:
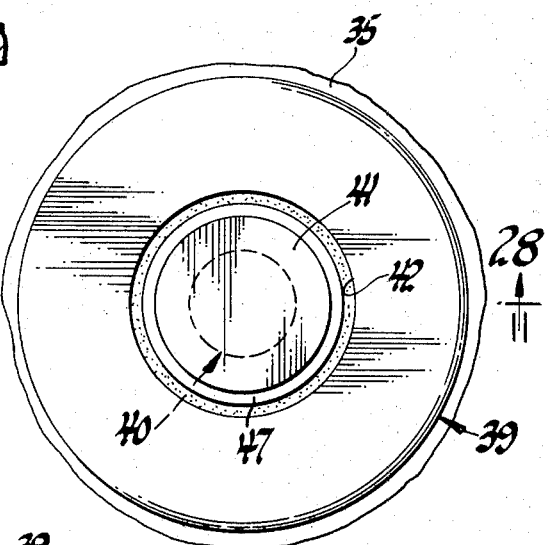
FIG. 27 is a top plan view of a single shock absorber member made in accordance with the principles of the present invention and encased in a cylindrical outer housing.
Figure 28:
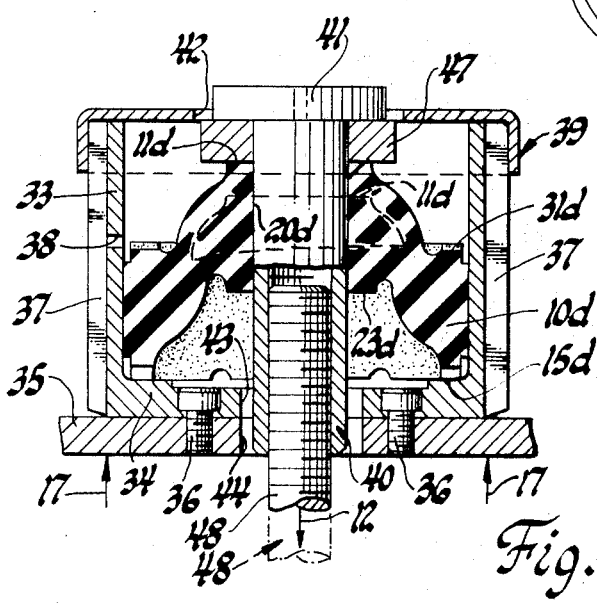
FIG. 28 is an elevational section view of the structure illustrated in FIG. 27, taken along the line 28—28 thereof, and looking in the direction of the arrows.

FIGS. 27 and 28 illustrate a shock absorber member 10d made in accordance with the principles of the present invention, and wherein a single shock absorber member 10d is slidably mounted within an outer cylindrical casing 33. The shock absorber unit of FIGS. 27 and 28 is provided with the same type of impact shaft 40 and means for attaching the shock absorber unit to a supporting plate 35 as in the structures of FIGS. 24 and 26. The shock absorber 28 would function in the same manner as the previously described embodiments.

It will be understood that the load bearing cap 21 of FIG. 4 and the load bearing caps 45 of FIG. 24 may be made from any suitable material. For example, if the next above shock absorber member 10d in the structure of FIG. 24 is always in engagement with the load cap 45, then the load cap 45 can be made of metal since there would not be any impact noise made by these members engaging each other. The same situation would also be present for the load bearing shaft 21 of FIG. 4. However, if the impact load is striking against a load bearing cap, then it would be desirable to make the load bearing cap from some material which would be sound suppressing in operation.

It has been found that the shock absorber members of the present invention are efficient in operation. It will be understood that in use, as the impact load illustrated in FIG. 1 is applied on the upper force-receiving surface 11, that it will cause compression on the upper surface of the shock absorber member and thereby generate a combined and superimposed bending and shear stress uniformly, radially outward from the center line of the shock absorber member. The upper force-receiving surface 11 is moved toward the lower force-receiving surface 15, but due to the resiliency of the material employed in making the shock absorber 10, the shock absorber will resume its original uncompressed position after absorbing the impact load 12 and suppressing the noise generated by the dissipation of the impact load.

It will be understood that the stacked structures illustrated in FIGS. 24, 26 and 28 can be used to absorb a tensile oriented force if the casing 33 were fixedly secured at its upper end to a supporting structure instead of at the lower end as shown in FIG. 28. It will be understood that the casing 33 may be made from any suitable material as, for example, cast steel. As shown in FIG. 28, when an impact load 12 is impressed on shaft 48 the upper force-receiving surface 11d of the shock absorber member 10d would be moved downward as illustrated by the position 11d', and the shaft moved downward as illustrated by the position 48'. The counter-resisting forces 17 are illustrated as being carried by the supporting plate 35 and the end wall 34. The end wall 34 supports the lower force-receiving surface 15d. After the impact load has been removed, the shock absorber member 10d resumes its initial position shown in the solid lines in FIG. 28.

While it will be apparent that the preferred embodiments of the invention herein disclosed are well calculated to fulfill the objects above stated, it will be appreciated that the invention is susceptible to modification, variation and change.

What is claimed is:

1. A shock absorber structure, comprising:
   a. a unitary resilient member having an annular force-receiving surface on the lower end thereof, and a force-receiving surface on the upper end thereof and disposed radially within and axially spaced apart from said lower force-receiving surface, said force-receiving surfaces being disposed parallel to each other; and,
   b. said member being inverted dish-shaped in vertical cross section and provided with an axially inward extended recess on the lower side thereof, within the annular lower force-receiving surface.

2. A shock absorber structure as defined in claim 1, wherein:
   a. said unitary resilient member is provided with an axial bore therethrough.

3. A shock absorber structure as defined in claim 1, wherein:
   a. said unitary resilient member is provided with an impact receiving button mounted on the force-receiving surface on the upper end thereof.

4. A shock absorber structure as defined in claim 1, wherein:
   a. said unitary resilient member is provided around the upper periphery thereof with an upper load transmitting surface in vertical alignment with the lower force-receiving surface; and,
   b. said unitary resilient member is provided on the lower end thereof at the inner end of said recess with a lower load transmitting surface parallel with the upper force-receiving surface.

5. A shock absorber structure as defined in claim 4, wherein:
   a. said unitary resilient member is provided with an axial bore therethrough.

6. A shock absorber structure as defined in claim 5, wherein:
   a. said unitary resilient member is provided with an upper surface which is conically shaped radially outward from said upper force-receiving surface; and,
   b. said unitary resilient member is provided with a lower surface in said recess which is conically shaped radially outward from said lower load transmitting surface.

7. A shock absorber structure as defined in claim 6, wherein:
   a. said upper and lower surfaces are parallel.

8. A shock absorber structure as defined in claim 6, wherein:
   a. said upper and lower surfaces converge radially outward.

9. A shock absorber structure as defined in claim 6, wherein:
   a. said upper and lower surfaces diverge radially outward.

10. A shock absorber structure as defined in claim 5, wherein:
    a. said unitary resilient member is provided with an upper surface which is conically shaped radially outward from said upper force-receiving surface.

11. A shock absorber structure as defined in claim 10, wherein:
    a. said unitary resilient member is provided with a lower surface in said recess which is shaped concave upwardly, radially outward from said lower load transmitting surface.

12. A shock absorber structure as defined in claim 10, wherein:
    a. said unitary resilient member is provided with a lower surface in said recess which is shaped convex downwardly, radially outward from said lower load transmitting surface.

13. A shock absorber structure as defined in claim 5, wherein:
    a. said unitary resilient member is provided with a lower surface in said recess which is conically shaped radially outward from said lower load transmitting surface.

14. A shock absorber structure as defined in claim 13, wherein:
    a. said unitary resilient member is provided with an upper surface which is shaped convex upwardly, radially outward from said upper force-receiving surface.

15. A shock absorber structure as defined in claim 13, wherein:
    a. said unitary resilient menber is provided with an upper surface which is shaped concave downwardly, radially outward from said upper force-receiving surface.

16. A shock absorber structure as defined in claim 5, wherein:
    a. said unitary resilient member is provided with an upper surface which is shaped concave downwardly, radially outward from said upper force-receiving surface.

17. A shock absorber structure as defined in claim 16, wherein:
    a. said unitary resilient member is provided with a lower surface which is shaped convex downwardly, radially outward from said lower load transmitting surface.

18. A shock absorber structure as defined in claim 16, wherein:
    a. said unitary resilient member is provided with a lower surface which is shaped concave upwardly, radially outward from said lower load transmitting surface.

19. A shock absorber structure as defined in claim 5, wherein:
    a. said unitary resilient member is provided with an upper surface which is shaped convex upwardly, radially outward from said upper force-receiving surface.

20. A shock absorber structure as defined in claim 19, wherein:

a. said unitary resilient member is provided with a lower surface which is shaped concave upwardly, radially outward from said lower load transmitting surface.

21. A shock absorber structure as defined in claim 19, wherein:
   a. said unitary resilient member is provided with a lower surface which is shaped convex downwardly, radially outward from said lower load transmitting surface.

22. A shock absorber structure as defined in claim 21, wherein:
   a. the vertical cross section area of said unitary resilient member increases radially outward from said upper load receiving surface.

23. A shock absorber structure as defined in claim 21, wherein:
   a. the vertical cross section area of said unitary resilient member decreases radially outward from said upper load receiving surface.

24. A shock absorber structure as defined in claim 5, wherein:
   a. said unitary resilient member is provided with an upper surface which is conically shaped radially outward from said upper force-receiving surface;
   b. said unitary resilient member is provided with a lower surface which is shaped concave upwardly, radially outward from said lower load transmitting surface; and,
   c. the vertical cross section of said unitary resilient member decreases radially outward from said axial bore so as to provide a constant vertical and circular cross section area progressively outward from said axial bore.

25. A shock absorber as defined in claim 5, wherein:
   a. said axial bore is disposed nonconcentric with said lower force-receiving surface.

26. A shock absorber having a pair of shock absorber members, as defined in claim 1, wherein:
   a. said pair of shock absorber members are disposed with one member in an inverted position and having the upper force-receiving surface thereof disposed on the upper force-receiving surface of the other member.

27. A shock absorber having a pair of shock absorber members as defined in claim 1, wherein:
   a. said pair of shock absorber members are disposed with one member in an inverted position and having the lower force-receiving surface thereof disposed on the lower force-receiving surface of the other member.

28. A shock absorber having a plurality of shock absorber members as defined in claim 4, wherein:
   a. said plurality of shock absorber members are disposed in a vertically stacked arrangement with the upper load transmitting surface of a lower member supporting the lower force-receiving surface of the next above disposed member; and,
   b. with the upper force receiving surface of said lower member supporting the lower load transmitting surface of said next above disposed member.

29. A shock absorber as defined in claim 28, wherein:
   a. each of said plurality of shock absorber members is provided with an axial bore therethrough.

30. A shock absorber as defined in claim 29, wherein:
   a. said plurality of shock absorber members are operatively mounted within a cylindrical outer housing.

31. A shock absorber as defined in claim 30, wherein:
   a. said outer housing is provided on the outer surface thereof with a plurality of cooling fins.

32. A shock absorber as defined in claim 30, wherein:
   a. each of said plurality of shock absorber members is provided with cooling passages formed radially through said upper load transmitting surfaces and said lower force-receiving surfaces; and,
   b. said outer housing is provided with a plurality of cooling passages therethrough to communicate with said passages in said plurality of shock absorber members.

33. A shock absorber as defined in claim 30, including:
   a. a load transmitting shaft operatively mounted through the bores in said plurality of shock absorber members and having a head on one end operatively seated on the upper force-receiving surface of the uppermost shock absorber member;
   b. means operatively connecting each of said shock absorber members to said load transmitting shaft at the upper force-receiving surfaces thereof;
   c. said housing being provided with a radial inwardly extended end wall disposed against the lower force-receiving surface of the lowermost one of said plurality of shock absorber members; and,
   d. said housing radial end wall being provided with an axial opening through which is extended the other end of said load transmitting shaft.

34. A shock absorber as defined in claim 33, wherein:
   a. each of said lowermost ones of said plurality of shock absorber members is provided with a load cap on the upper force-receiving surface on which is seated the lower load transmitting surface of the next above disposed shock absorber member.

35. A shock absorber as defined in claim 34, wherein:
   a. each of said load caps is engageable with said means for operatively connecting each of said shock absorber members to said load transmitting shaft.

36. A shock absorber as defined in claim 5, wherein:
   a. said unitary resilient member is operatively mounted within a cylindrical outer housing.

37. A shock absorber as defined in claim 36, wherein:
   a. said cylindrical housing is provided with a radial inwardly extended end wall disposed against the lower force-receiving surface of said unitary resilient member.

* * * * *

UNITED STATES PATENT OFFICE
CERTIFICATE OF CORRECTION

Patent No. 3,831,923      Dated August 27, 1974

Inventor(s) CHARLES R. MELDRUM

It is certified that error appears in the above-identified patent and that said Letters Patent are hereby corrected as shown below:

Column 2, line 9, before "apart" insert -- spaced --.
Column 2, line 13, after "annular" insert -- lower --.
Column 5, line 63, change "repsec" to -- respec --.
Column 7, line 41, change "230" to -- 23o --.
Column 7, line 45, before "surface" insert -- lower --.
Column 9, line 28, change "39" to -- 38 --.

Signed and sealed this 19th day of November 1974.

(SEAL)
Attest:

McCOY M. GIBSON JR.
Attesting Officer

C. MARSHALL DANN
Commissioner of Patents